April 6, 1948.   G. B. THIEME   2,439,113
VALVE CONTROLLING MECHANISM
Filed July 15, 1944   2 Sheets-Sheet 1

INVENTOR.
George B. Thieme.
BY
Roy D. Bateman.
ATTORNEY

April 6, 1948.　　　　G. B. THIEME　　　　2,439,113
VALVE CONTROLLING MECHANISM
Filed July 15, 1944　　　　2 Sheets-Sheet 2
Fig. 2.
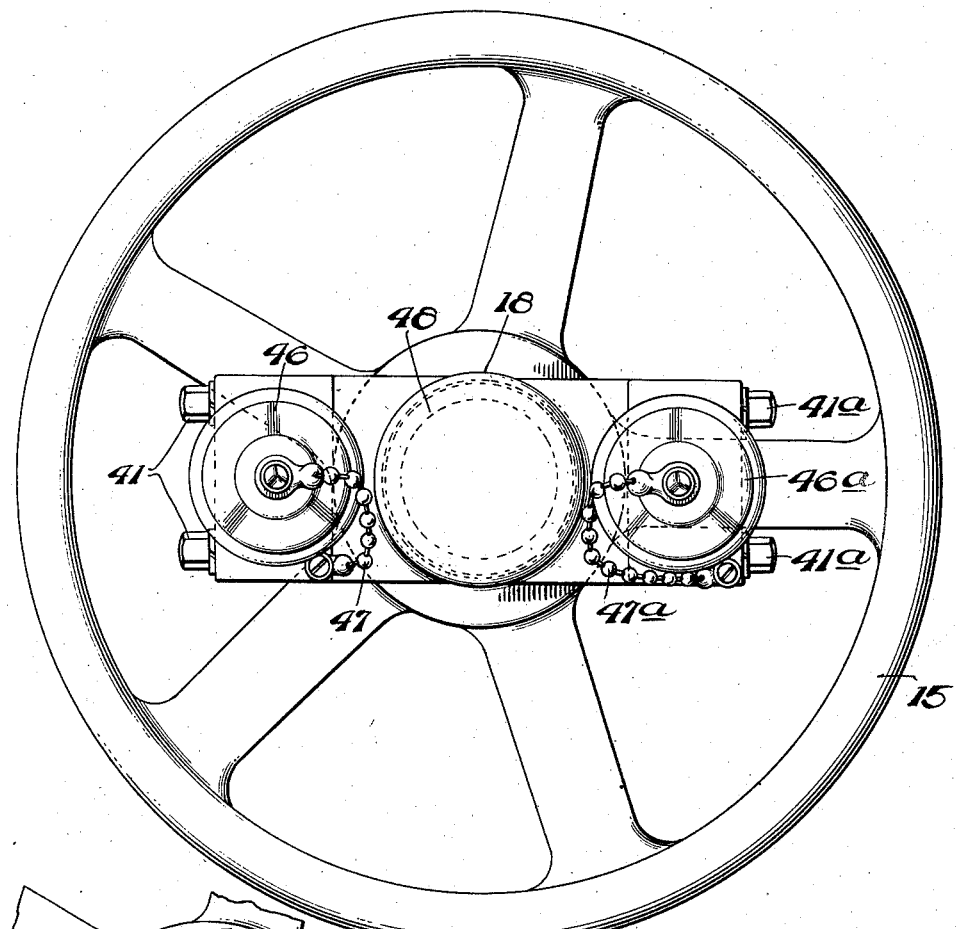
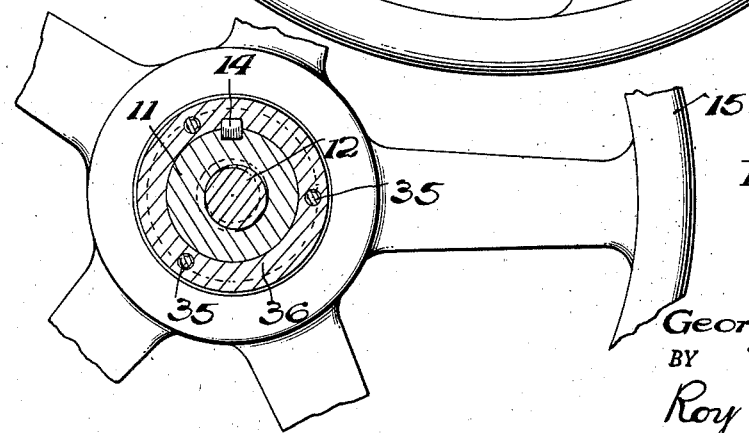
Fig. 3.
INVENTOR.
George B. Thieme.
BY
Roy D. Bateman
ATTORNEY Patented Apr. 6, 1948

2,439,113

UNITED STATES PATENT OFFICE 2,439,113

VALVE CONTROLLING MECHANISM

George B. Thieme, Jamaica, N. Y., assignor to Bendix Aviation Corporation, Brooklyn, N. Y., a corporation of Delaware Application July 15, 1944, Serial No. 545,127

8 Claims. (Cl. 70—176)

1

This invention relates to valve controlling mechanisms and is particularly concerned with valves embodying devices for locking them in open and closed position, although the novel locking mechanism of the invention may be applied to other devices, and is therefore not limited to such use.

Although mechanisms have been heretofore proposed for locking valves, they have not been altogether successful because some of them are associated with the valve in such manner that the mechanical advantage afforded by the screw lift has been applied directly to the locking bolt or other part, resulting in shearing thereof, while others have provided an inadequate locking action or have been of complicated costly construction.

I have found that by associating tubular or sleeve-like telescoping members with the valve stem and the wheel or other rotatable valve actuating part, and mounting one or more locking devices on the outer sleeve, a simple, low-cost, but yet rugged and efficient locking mechanism is provided in which relative motion of the two sleeves is resisted by helically directed arresting forces, and which is so constructed that it may be applied to existing valves as an accessory, with a minimum of changes in the existing valve structure.

It is accordingly the major object of this invention to provide a novel valve locking mechanism embodying a simple, low-cost device, which is operable to efficiently lock the valve in at least one of its operative positions, and yet which is of rugged, trouble-free construction.

A further object is to provide a novel valve locking device capable of ready attachment to the valve stem and valve operating wheel of existing valves, and which will efficiently lock the valve in at least one of its operative positions.

Another object is to provide a novel valve controlling mechanism capable of ready attachment to existing valves of the gate type, and which embodies means for compensating for the normal wear of the valve parts, so that its locking action is not impaired, even after long periods of service.

A further object is to provide a unitary valve locking mechanism made up of telescoped inner and outer sleeve members which embody novel provisions for securing them to the relatively movable parts of a valve mechanism, and also embody means selectively for locking them against relative rotation.

Further objects will appear as the specification proceeds in conjunction with the annexed drawings, and from the appended claims.

2

In the drawings:

Fig. 1 is a vertical sectional view through a valve operating mechanism, showing the controlling device of the invention applied thereto.

Fig. 2 is a top plan view of the valve operating construction shown in Fig. 1.

Fig. 3 is a fragmental sectional view taken substantially on the line 3—3 of Fig. 1, looking in the direction of the arrows.

Fig. 4 is a fragmental sectional view taken substantially on the line 4—4 of Fig. 1, and Fig. 5 is a sectional view taken substantially on the line 5—5 of Fig. 1.

With continued reference to the drawings, in which like reference characters have been employed to designate similar parts throughout the several views, the invention has been illustrated as applied to a gate valve structure having a valve body 10 in which an internally threaded operating sleeve or quill 11 is journalled for free rotation.

The valve is of the gate type (not shown) and embodies a vertically reciprocable operating member terminating in a threaded stem 12, which as seen in Fig. 1, meshes with an internally threaded section 13 of quill 11. Secured for unitary rotation with quill 11, by means of a key 14, is a hand wheel 15 which is utilized to raise and lower the valve stem to open and close the valve respectively, in well known manner.

The novel control mechanism of the invention comprises an inner sleeve 17 and an outer sleeve 18, secured respectively to valve stem 12 and hand wheel 15 for unitary movement therewith, and also a pair of locking devices, to be hereinafter described. The inner sleeve is secured to the valve stem in the novel manner which will now be set forth.

Referring to Figs. 1 and 4, the thread adjacent the upper end of screw 12 is filed or ground away on opposite sides to provide parallel surfaces 19 of substantial area. The lower end of sleeve 17 is provided with an enlarged boss portion 21, having an internal passage 22 of non-circular cross-section, as seen in Fig. 4 which fits over the upper end of screw 12. The passage provides opposed parallel faces 23 which cooperate with the cut-away side faces 19 of the screw threads, to preclude relative rotation of the screw and sleeve 17.

A cap screw 24, threaded into the end of the screw and bearing against a washer 25 in the bottom of the sleeve, rigidly secures the parts together. Sleeve 17 is provided with a lower lock opening 27 and an upper locking recess 28, for coaction with the two locking devices to be hereinafter described.

The lower end of sleeve 18 snugly fits over the outer surface of an adapter 29, and is detachably and adjustably secured thereto by a plurality of cap screws 31. As seen in Fig. 5, screws 31 project through openings 32 in sleeve 18 and threadedly engaged openings 33 in the adapter. Inasmuch as openings 32 are spaced 30° apart, sleeve 18 may be adjusted by 30° increments with respect to the adapter by removing screws 31; rotating the parts through the desired angle; and reinserting the screws, to lock the parts in place.

Adapter 29 also functions as a nut and to this end threadedly engages the threaded upper end of quill 11. It is apparent that by tightly threading the adapter down upon wheel 15, the latter is rigidly secured in place, being forced against a shoulder 34 on the quill, and being restrained against rotation by key 14. The adapter is locked in place by plurality of cap screws 35, which are threaded into the hub 36 of wheel 15.

From the foregoing disclosure it is apparent that sleeves 17 and 18 are rigidly connected to screw 12 and wheel 15, and that in response to rotation of wheel 15, the sleeves will undergo a relative combined rotational and axial or helical movement. While various types of lock mechanisms may be utilized to restrain the parts against such relative helical movement in positions corresponding to valve-closing and valve-opening positions, I preferably employ the novel lock assembly now to be described.

Referring to Fig. 1, sleeve member 18 is provided with a mounting pad 38 to which a lock assembly 39 is secured by means of a pair of cap screws 41. The specific locking device may be of any well-known character, and it is operated by a key 42, and has a plunger 43 mounted for reciprocation in a bore 44 of mounting pad 38. As seen in Fig. 1, plunger 43 is disposed in retracted or unlocking position, out of the path of travel of sleeve 17. Locking assembly 39 also embodies a thimble 45 over which a cap 46 snugly seats. The cap functions to protect the lock from ingress of extraneous material, and a retaining chain 47 is associated with it to prevent loss when it is removed incident to manipulation of key 42.

Sleeve member 18 also carries a second lock device, and as it is of substantially identically similar construction to that just described, similar reference characters, with the subscript "a" have been employed to designate them. Keys 42 and 42a however are preferably different, so that two separate keys are necessary to operate the device. This makes it possible to set up a predetermined sequence of operation in a system, as for instance a chemical process.

Sleeve 18 is also preferably provided with a closed upper end 48 to protect the interior against entrance of extraneous material. However, a plurality of small openings 49 are provided in the side wall of the sleeve adjacent the closed end, to permit ingress and egress of air, thereby avoiding setting up a piston and cylinder action in response to reciprocation of sleeve 17 within sleeve 18 during operation.

The holes appearing in the heads of cap screws 31, 41, and 41a, are for the purpose of receiving lock wire and seal assemblies, to prevent removal without breaking the wire or seal, in the manner well understood in the art.

Taking up the operation of the apparatus, it is to be observed that the parts are illustrated in Fig. 1 in the positions which they assume when the valve is in closed position. The parts are locked in this condition by reason of the fact that plunger 43a of lock device 39a is disposed within recess 28 of inner sleeve 17. It should be particularly observed that since walls of recess 28 exert a substantially tangentially or circularly directed force upon plunger 43a, as distinguished from an endwise or axially directed force any attempts to rotate wheel 15 will be directly resisted, and there is no possibility of subjecting the parts to excessive pressures, as would be the case if an attempt were made to lock the parts by applying solely axially directed arresting forces to sleeve 17. In other words, the torque applied by grasping and turning wheel 15 results in a comparatively large endwise force exerted upon screw 13, as is well understood in the art and it is apparent that if the lock device directly resisted this force it would be subjected to severe shearing forces. By having it resist rotational forces only, the lock mechanism is so designed that the mechanical advantage afforded by the screw-lift is not exerted upon plunger 43 or 43a.

Assuming that the parts are in the position shown in Fig. 1, and that it is desired to open the valve, key 42a is inserted in lock 39a and rotated so as to withdraw locking plunger 43a from recess 28. This removes the plunger from the path of travel of sleeve 17 and wheel 15 may accordingly be rotated to open the valve and to lift screw 12 and sleeve 17 into the dotted line position shown in Fig. 1. The parts are now in valve-opening position, and if it is desired to lock them in such condition, key 42 is inserted in lock 39 and rotated so as to project lock plunger 43 into opening 27 of sleeve 17, which is now aligned with the plunger.

In order to insure proper location of openings 27 and 28, the parts are initially fully assembled except for lock assemblies 39 and 39a. The valve is first placed in the closed position shown in full lines in Fig. 1, and a hole is drilled through the upper end of sleeve 17, using bore 44a as a drill guide. The valve is then moved into the open position, which disposes the parts in the dotted line position of Fig. 1. Hole 27 is now drilled, using bore 44 as a drill guide. Upon completion of the foregoing operation, the parts are disassembled, and the uppermost opening in sleeve 17 has its upper portion cut away so as to form open-sided recess 28. After removing any chips produced incident to drilling, the parts are reassembled, lock assemblies 39 and 39a are applied, and the device is ready for operation.

In the event that after the device has been in use for some time, wear of the valve parts occurs to such an extent as to prevent openings 27 and 28 from properly registering with their lock plungers, cap screws 31 may be removed and sleeve 18 and adapter 29 rotated relatively in the proper direction to restore proper alignment of the plungers with the openings 27 and 28, it being understood that since openings 27 and 28 are disposed along the same helical path, and are located 180° apart, alignment of one opening with its plunger, will simultaneously bring the other opening into alignment with its lock plunger.

Since visual observation of the position of the lifting screw is relied upon to show the closed or open position of the valve in valves of this character, and, as it is concealed by sleeve 18, of the lock mechanism of the present invention, an opening 51 is preferably provided in the side wall of sleeve 18, and indicia means are associated with inner sleeve 17, for indicating the condition of the valve. For instance, an area of green paint may be applied adjacent the top of sleeve 17, and an area of red paint applied adjacent the bottom of the sleeve, which may be observed through the window produced by opening 51 to visibly indicate the closed and open positions of the valve respectively.

From the foregoing detailed disclosure of the invention, it is apparent that I have provided a valve control mechanism of simple design which will efficiently lock the valve in either its closed or open position, and may be readily applied to existing valve structures as an accessory with a minimum of changes, and yet which is of rugged construction.

It is to be understood that while I have shown separate locking devices for locking the valve stem in its two positions, if desired a single locking device, having a locking bolt coacting with a pair of properly located openings in sleeve 17 may be used without departing from the spirit of the invention. Also, if it is desired to lock the valve in only one of the two positions, one of the lock mechanisms (39 or 39a) may be omitted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed is:

1. In a valve mechanism having an actuating member mounted for movement from a valve-closing position to a valve-opening position, an operating member mounted for helical movement relatively to said actuating member; and locking means, carried by one of said members and coacting with the other of said members and operable to exert helically directed forces thereupon and lock said actuating member in at least one of said positions, said actuating member and said operating member comprising an inner sleeve and an outer sleeve disposed in telescoping relationship, said sleeves being telescoped for a distance at least as great as the range of travel of said actuating member between valve-opening and valve-closing positions, and said locking means being carried by said outer sleeve.

2. A locking mechanism adapted to be applied as an accessory to valves of the type having a reciprocable stem actuated between valve-closing and valve-opening positions by means of a rotatable member, comprising an inner sleeve-like element adapted to be secured to said stem; an outer sleeve-like element surrounding said inner sleeve and adapted to be secured to said rotatable member; both said inner and outer sleeve elements extending beyond one end of said valve stem and said rotatable member respectively a distance at least as great as the travel of said valve stem between valve-opening and valve-closing positions, whereby said elements are constantly disposed in telescoped relationship irrespective of the shifted position of said valve stem, and locking means carried by one of said sleeve-like elements and coacting with the other elements to lock said elements in predetermined angular and endwise shifted relationship, to thereby maintain said valve stem and rotatable member in a predetermined position.

3. The locking mechanism defined in claim 2, wherein said valve stem comprises a screw having a non-circular formation seating in a non-circular socket in said inner sleeve, for insuring unitary movement thereof.

4. The locking mechanism defined in claim 2, wherein said outer sleeve terminates adjacent said rotatable member in a device for securing it to said rotatable member in agularly adjustable relationship thereto.

5. In a valve mechanism, a threaded valve stem mounted for endwise reciprocation from a valve-closing position to a valve-opening position; a cylindrical member secured to the free end of said valve stem for unitary movement therewith; a rotatable structure threadedly connected to said valve stem and operable to move the latter endwise between valve-closing and valve-opening positions when rotated; said cylindrical member having a recess therein located in predetermined relationship to the threads of said valve stem, an outer cylindrical member secured for unitary rotation with said rotatable structure and disposed in telescoping relationship with said first-named cylindrical member; and at least one locking device carried by said outer cylindrical member and coacting with the walls of said recess in said first-named cylindrical member to lock said inner and outer cylindrical members against rotation, to thereby lock said valve stem in at least one of said positions, said cylindrical members being substantially larger in diameter than said threaded valve stem.

6. In a valve of the gate type having a longitudinally shiftable screw-threaded actuating stem and a wheel threaded onto the stem for producing longitudinal movement of said stem when it is rotated; a longitudinally extending inner sleeve rigidly secured to the end of said stem remote from the valve and adapted to undergo longitudinal shifting movement in unison with said stem, but locked against relative rotation, said sleeve having a recess therein located in a predetermined relationship with respect to said stem when the latter is in valve-closing position, an outer sleeve telescoped over said inner sleeve, fastening means securing one end of said outer sleeve to said handwheel; locking means carried by said outer sleeve and including a locking bolt projectible into the recess of said inner sleeve for locking said sleeves against rotation and holding said valve stem in valve-closing position, said fastening means providing rotatable adjustment of said outer sleeve through predetermined angular increments with respect to said handwheel, so that said outer sleeve may be adjusted by one or more angular increments with respect to said handwheel, whereby the valve stem may be operated through small distances when said sleeves are locked together by said bolt, for the purpose of re-establishing the proper locked position of said valve stem after the parts have become worn in service.

7. In a valve mechanism, a threaded valve stem mounted for endwise reciprocation from a valve-closing position to a valve-opening position; a cylindrical member secured to the free end of said valve stem for unitary movement therewith; a rotatable structure threadedly connected to said valve stem and operable to move the latter endwise between valve-closing and valve-opening positions when rotated; said cylindrical member having a recess therein located in predetermined relationship to the threads of said valve stem, an outer cylindrical member secured for unitary rotation with said rotatable structure and disposed in telescoping relationship with said first-named cylindrical member; and at least one locking device carried by said outer cylindrical member and coacting with the walls of said recess in said first-named cylindrical member to lock said inner and outer cylindrical members against rotation, to thereby lock said valve stem in at least one of said positions, said outer cylindrical member being secured for angular adjustable movement with respect to said rotatable structure, whereby the angular relationship of said valve stem when said locking device is projected into said recess may be adjustably varied and wear of said valve stem may be compensated for.

8. In a valve mechanism, a threaded valve stem mounted for endwise reciprocation from a valve-closing position to a valve-opening position; a cylindrical member secured to the free end of said valve stem for unitary movement therewith; a rotatable structure threadedly connected to said valve stem and operable to move the latter endwise between valve-closing and valve-opening positions when rotated; said cylindrical member having a recess therein located in predetermined relationship to the threads of said valve stem, an outer cylindrical member secured for unitary rotation with said rotatable structure and disposed in telescoping relationship with said first-named cylindrical member; and at least one locking device carried by said outer cylindrical member and coacting with the walls of said recess in said first-named cylindrical member to lock said inner and outer cylindrical members against rotation, to thereby lock said valve stem in at least one of said positions, said outer cylindrical member terminating in a closed end adjacent the end of said first-named cylindrical member, for totally enclosing the interior of said device, and extending axially a distance sufficient to allow full travel of said first-named cylindrical member between valve-closing and valve-opening positions.

GEORGE B. THIEME.

REFERENCES CITED

The following references are of record in the file of this patent:

UNITED STATES PATENTS

| Number | Name | Date |
|---|---|---|
| 1,991,504 | Hopkins | Feb. 19, 1935 |
| 2,213,264 | Wall | Sept. 3, 1940 |
| 2,324,633 | McCarthy et al | July 20, 1943 |